3,247,216
4-PHENYL-2-PYRIDYL-BUTYRIC ACIDS
William Laszlo Bencze, New Providence, N.J., assignor to Ciba Corporation, a corporation of Delaware
No Drawing. Filed Aug. 28, 1961, Ser. No. 134,117
6 Claims. (Cl. 260—295)

This application is a continuation-in-part of application Serial No. 74,222, filed December 7, 1960, now abandoned.

The present invention concerns benz[b]cycloalkan-1-ones, which contain in the α-position to the carbonyl group a pyridyl group. More especially, the present invention relates to compounds of the formula:

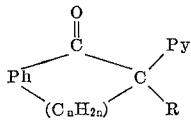

in which Ph stands for a 1,2-phenylene (o-phenylene) radical, Py represents a pyridyl group, R stands for hydrogen or lower alkyl, and the group of the formula —($C_nH_{2n}$)—, in which the letter $n$ stands for a whole number from one to seven, represents an alkylene radical and separates the 1,2-phenylene radical Ph from the carbon atom carrying the pyridyl group Py by one to three carbon atoms, ketone derivatives of such compounds, or salts thereof, as well as N-oxides, salts of N-oxides, quaternary ammonium derivatives of such compounds, and process for their preparation.

The 1,2-phenylene (o-phenylene) radical Ph stands for an unsubstituted 1,2-phenylene or a substituted 1,2-phenylene radical. Substituents attached to the latter are, for example, aliphatic groups, such as lower alkyl, e.g., methyl, ethyl, n-propyl, isopropyl, n-butyl and the like, substituted aliphatic groups, such as halogeno-lower alkyl, e.g., trifluoromethyl and the like, hydroxyl, etherified hydroxyl, particularly lower alkoxy, e.g., methoxy, ethoxy, n-propyloxy, isopropyloxy, n-butyloxy and the like, as well as lower alkenyloxy, e.g., allyloxy, 2-methylallyloxy and the like, lower alkylene-dioxy, e.g., methylenedioxy and the like, lower cycloalkyloxy, e.g., cyclopentyloxy, cyclohexyloxy and the like, esterified hydroxyl, especially halogeno (representing hydroxyl esterified with a hydrohalic acid), e.g., fluoro, chloro, bromo and the like, mercapto, etherified mercapto, particularly lower-alkyl-mercapto, e.g., methylmercapto, ethylmercapto and the like, nitro, amino, especially primary amino, as well as secondary amino, such as N-lower alkyl-amino, e.g., N-methylamino, N-ethylamino and the like, tertiary amino, such as N,N-di-lower alkyl-amino, e.g., N,N-dimethylamino, N-ethyl-N-methylamino, N,N-diethylamino and the like, or N-acyl-amino, in which acyl represents the acyl radical of an organic carboxylic acid, such as an aliphatic acid, particularly a lower alkane carboxylic acid, e.g., acetic, propionic, pivalic acid and the like, a substituted aliphatic, particularly lower alkanoic, acid, e.g., cyclohexylacetic, 3-cyclopentylpropionic, dichloroacetic acid and the like, a carbocyclic aryl carboxylic acid, e.g., benzoic, 4-methoxy-benzoic, 3,4,5-trimethoxybenzoic, 3,4-dichloro-benzoic, 3-N,N-dimethylaminobenzoic acid and the like, a carbocyclic arylaliphatic, especially a monocyclic carbocyclic aryl-lower alkane carboxylic acid or a monocyclic carbocyclic aryl-lower alkene carboxylic acid, e.g., phenylacetic, cinnamic acid and the like, or a heterocyclic, particularly a monocyclic heterocyclic, aryl carboxylic acid, e.g., nicotinic, isonicotinic, furoic acid and the like, or any other suitable organic carboxylic acid.

Substituted 1,2-phenylene groups are, for example, lower alkyl-1,2-phenylene, e.g., methyl-1,2-phenylene (such as 3-methyl-1,2-phenylene, 4-methyl-1,2-phenylene, 4,5-dimethyl-1,2-phenylene and the like), ethyl-1,2-phenylene (such as 4-ethyl-1,2-phenylene and the like), n-propyl-1,2-phenylene (such as 4-propyl-1,2-phenylene and the like), isopropyl-1,2-phenylene (such as 3-isopropyl-1,2-phenylene and the like), or any other analogous lower alkyl-1,2-phenylene radical, trifluoromethyl-1,2-phenylene (such as 4-trifluoromethyl-1,2-phenylene and the like), hydroxy-1,2-phenylene (such as 3-hydroxy-1,2-phenylene, 4-hydroxy-1,2-phenylene and the like), lower alkoxy-1,2-phenylene, e.g., methoxy-1,2-phenylene (such as methoxy1,2-phenylene, 4-methoxy-1,2-phenylene, 3,4-dimethoxy-1,2-phenylene and the like), ethoxy-1,2-phenylene (such as 3-ethoxy-1,2-phenylene, 4-ethoxy-1,2-phenylene, 3,6-diethoxy-1,2-phenylene and the like), n-propyloxy-1,2-phenylene (such as 4-n-propyloxy-1,2-phenylene and the like), isopropyloxy-1,2-phenylene (such as 3-isopropyloxy-1,2-phenylene and the like), n-butyloxy-1,2-phenylene (such as 4-n-butyloxy-1,2-phenylene and the like), or any other analogous lower alkoxy-1,2-phenylene radical, lower alkenyloxy-1,2-phenylene (such as 3-allyloxy-1,2-phenylene, 4-allyloxy-1,2-phenylene and the like), or any other analogous lower alkenyloxy-1,2-phenylene radical, lower alkylene-dioxy-1,2-phenylene, e.g. methylenedioxy-1,2-phenylene (such as 3,4-methylenedioxy-1,2-phenylene and the like), or any other analogous lower alkylenedioxy-1,2-phenylene radical, halogeno-1,2-phenylene, e.g., fluoro-1,2-phenylene (such as 3-fluoro-1,2-phenylene, 4-fluoro-1,2-phenylene, and the like), chloro-1,2-phenylene (such as 3-chloro-1,2-phenylene, 4-chloro-1,2-phenylene, 4,5-dichloro-1,2-phenylene 3,4,5,6-tetrachloro-1,2-phenylene and the like), bromo-1,2-phenylene (such as 4-bromo-1,2-phenylene, 3,6-dibromo-1,2-phenylene and the like), or any other analogous halogeno-1,2-phenylene radical, mercapto-1,2-phenylene (such as 4-mercapto-1,2-phenylene and the like), lower alkyl-mercapto-1,2-phenylene, e.g., methylmercapto-1,2-phenylene (such as 4-methylmercapto-1,2-phenylene and the like), ethylmercapto-1,2-phenylene (such as 3-ethylmercapto-1,2-phenylene and the like), or any other analogous lower alkyl-mercapto-1,2-phenylene radical, nitro-1,2-phenylene (such as 3-nitro-1,2-phenylene, 4-nitro-1,2-phenylene and the like), amino-1,2-phenylene (such as 3-amino-1,2-phenylene, 4-amino-1,2-phenylene and the like), N-lower alkylamino-1,2-phenylene, e.g. N-methylamino-1,2-phenylene (such as 3-N-methylamino-1,2-phenylene, 4-N-methylamino-1,2-phenylene and the like), N-ethylamino-1,2-phenylene (such as 3-N-ethylamino-1,2-phenylene and the like), or any other analogous N-lower alkyl-amino-1,2-phenylene radical, N,N-di-lower alkyl-amino-1,2-phenylene, e.g. N,N-dimethylamino-1,2-phenylene (such as 3-N,N-dimethylamino-1,2-phenylene, 4-N,N-dimethylamino-1,2-phenylene and the like), N-ethyl-N-methyl-amino-1,2-phenylene (such as 4-N-ethyl-N-methyl-amino-1,2-phenylene and the like), N,N-diethylamino-1,2-phenylene (such as 4-N,N-diethylamino-1,2-phenylene and the like), or any other N,N-di-lower alkyl-amino-1,2-phenylene radical, N-acyl-amino-1,2-phenylene, such as N-lower alkanoyl-amino-1,2-phenylene, e.g., N-acetylamino-1,2-phenylene (such as 4-N-acetylamino-1,2-phenylene and the like), N-pivaloylamino-1,2-phenylene (such as 4-N-pivaloylamino-1,2-phenylene and the like), as well as N-benzoylamino-1,2-phenylene (such as 4-N-benzoylamino-1,2-phenylene and the like), or any other analogous N-acyl-amino-1,2-phenylene radical, or any equivalent substituted 1,2-phenylene radical.

A pyridyl group Py represents an unsubstituted pyridyl radical, e.g., 2-pyridyl, 3-pyridyl or 4-pyridyl, as well as a substituted pyridyl radical containing lower alkyl, e.g. methyl, ethyl, n-propyl, n-butyl and the like, lower alkoxy, e.g. methoxy, ethoxy, n-propyloxy, isopropyloxy, n-butyloxy and the like, halogeno, e.g., fluoro, chloro, bromo and the like, or any other suitable group, as substituents attached to any of the positions available for substitution.

The group R, attached to the carbon atom carrying the pyridyl group, represents hydrogen, but may also stand for lower alkyl, especially methyl, as well as ethyl, n-propyl, isopropyl and the like.

The alkylene radical —$(C_nH_{2n})$—, in which the letter $n$ stands for a whole number from one to seven and which separates the 1,2-phenylene radical and the carbon atoms carrying the pyridyl group by one to three, particularly by two, carbon atoms, may form a straight or a branched carbon chain. It is represented primarily by 1,2-ethylene, as well as by methylene, 1,1-ethylene, 1-methyl-1,2-ethylene, 2-methyl-1,2-ethylene, 1,1-propylene, 1,3-propylene, 1,3-butylene, 2,3-butylene, 1,1-isobutylene and the like. In view of the fact that the 1,2-phenylene radical and the carbon atom carrying the pyridyl group are separated by one to three, particularly by two, carbon atoms, the compounds of the present invention are, therefore, about all 1,2,3,4-tetrahydro-naphthalen-1-one compounds, as well as indan-1-one or benz[b]suberan-1-one compounds, which contain in the α-position to the carbonyl group a pyridyl radical.

Ketone derivatives of the compounds of the invention are primarily those with nitrogen-containing ketone reagents, particularly with hydroxylamines, as well as with hydrazines, semicarbazides, thiosemicarbazides and the like. Such ketone derivatives are, therefore, primarily oximes, as well as hydrazones, semicarbazones, thiosemicarbazones and the like. Other ketone derivatives are the ketals with lower alkylenediols, e.g., ethylene glycol, 1,2-propylene glycol and the like, hydroxy-lower alkyl-mercaptans, e.g., 2-hydroxy-ethylmercaptan and the like, lower alkylene-dithiols, e.g., 1,2-dimercapto-ethane and the like.

Salts of the compounds of this invention are particularly pharmacologically and therapeutically acceptable, non-toxic acid addition salts, primarily those with inorganic acids, e.g., hydrochloric, hydrobromic, nitric, sulfuric, phosphoric acids, as well as with organic acids, such as organic carboxylic acids, e.g., acetic, glycolic, maleic, hydroxymaleic, dihydroxymaleic, malic, tartaric, citric, salicylic acid and the like, or organic sulfonic acids, e.g., methane sulfonic, ethane sulfonic, 2-hydroxyethane sulfonic, p-toluene sulfonic acid and the like. Salts which are primarily used for identifications purposes are particularly those with acidic organic nitro compounds, e.g., picric, picrolonic, flavianic acid and the like, or with metal complex acids, e.g. phosphotungstic, phosphomolybdic, chloroplatinic, Reinecke acid and the like.

Also included within the scope of this invention are the N-oxides and the salts, particularly the pharmacologically acceptable acid addition salts of such N-oxides with the above-mentioned inorganic and organic acids.

Quaternary ammonium derivatives of the compounds of this invention are particularly those with reactive esters formed by hydroxylated compounds and strong acids, such as those with lower alkyl halides, e.g., methyl, ethyl, propyl or isopropyl chloride, bromide or iodide and the like, di-lower alkyl sulfates, e.g., dimethyl sulfate, diethyl sulfate and the like, lower alkyl lower alkane sulfonates, e.g., methyl or ethyl methane sulfonate or ethane sulfonate and the like, lower alkyl monocyclic carboxylic aryl sulfonates, e.g., methyl p-toluene sulfonate and the like, phenyl-lower alkyl halides, e.g., benzyl, 1-phenylethyl or 2-phenylethyl chloride, bromide or iodide and the like. Also included as quaternary ammonium compounds are the quaternary ammonium hydroxides, and the salts obtained by reacting such quaternary ammonium hydroxides with inorganic or organic acids, such as with those described hereinbefore as being suitable for the preparation of acid addition salts.

The compound of the present invention may be in the form of racemates or optically active antipodes.

Known adrenal cortex inhibitors, which cause a decrease of hydrocortisone (Compound F) and corticosterone (Compound B), also show an increase in the secretion of 11-desoxy-17α-hydroxy-corticosterone (Compound S); they appear, therefore, to be inhibitors of the 11β-hydroxylase enzyme system. Contrary to the known ones, the compounds of this invention or derivatives thereof cause a decrease of hydrocortisone (Compound F) accompanied by an increase of the secretion of corticosterone (Compound B); however, no increase in the secretion of 11-desoxy-17α-hydroxy-corticosterone (Compound S) can be observed; they appear, therefore, to be inhibitors of the 17α-hydroxylase enzyme system. Other tests, particularly in vitro-tests with rat adrenal slices, have shown that compounds of the present invention prevent the formation of hydrocortisone (Compound F) aldosterone and other steroids produced by the adrenal.

The compounds of the present invention, and derivatives thereof having such specific adrenal cortex inhibiting effects, can, therefore, be used as diagnostic tools for the determination of the functioning of the pituitary gland, as well as in the treatment of conditions causing adrenal cortical hyperfunction, such as Cushing's syndrome, primary aldosteronism, secondary aldosteronism and the like. Furthermore, the preferential inhibition of the 17α-hydroxylase enzyme system makes the compounds of this invention useful as aids in the study of biosynthetic pathways of corticoid synthesis. It has also been determined by way of tests in dogs, that the compounds of this invention show oral activity. Compounds of this invention are also useful as intermediates in the preparation of other compounds.

The compounds of the formula:

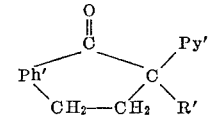

in which Py' represents pyridyl, particularly 3-pyridyl or 4-pyridyl, Ph' stands for 1,2-phenylene, lower alkyl-1,2-phenylene, hydroxy-1,2-phenylene. Lower alkoxy-1,2-phenylene, halogeno-1,2-phenylene, nitro-1,2-phenylene or amino-1,2-phenylene, and R' represents hydrogen or methyl, the oximes thereof and the pharmacologically acceptable acid addition salts of such compounds, represent a preferred group of compounds, which show particularly outstanding adrenal inhibiting effects of the above-mentioned type.

The new compounds of this invention may be used in the form of pharmaceutical preparations, which contain the new compounds or salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other carrier for pharmaceutical preparations. The latter may be in the solid form, for example, as capsules, tablets, dragees and the like, or in liquid form, for example, as solutions, suspensions, emulsions and the like. If desired, they may contain auxiliary substances such as preserving, stabilizing, wetting, emulsifying agents and the like, salts for varying the osmotic pressure, buffers, etc. They may also contain, in combination, other pharmacologically useful substances.

The compounds of the present invention may be prepared according to known methods, for example, by reacting a phenyl-alkane carboxylic acid, which contains a pyridyl group in the α-position to the carboxyl group, or a functional derivative of such carboxylic acid, particularly a compound of the formula:

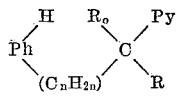

in which Ph, Py, R, $n$ and the group of the formula —$(C_nH_{2n})$— have the previously given meaning, and $R_o$ stands for a carboxyl group or a functionally converted carboxyl group, or a salt, an N-oxide or a salt of an N-oxide of such compound, with a strong Lewis acid ring closing reagent, and, if desired, converting a resulting salt into the free compound or into another salt, and/or, if desired, replacing in a resulting compound, which contains a hydrogen attached to the carbon atom carrying the pyridyl group, such hydrogen atom by lower alkyl, and/or, if desired, introducing into the carbocyclic aryl, e.g., the 1,2-phenylene, portion of a resulting compound a substituent, and/or, if desired, converting in a resulting compound a substituent attached to the carbocyclic aryl, e.g., the 1,2-phenylene, portion into another substituent, and/or, if desired, converting a resulting compound into a ketone derivative, an N-oxide, or a quaternary ammonium derivative thereof, and/or, if desired, converting a resulting compound, a ketone derivative or an N-oxide thereof into a salt, and/or, if desired, separating a resulting mixture of isomers into the single isomers.

In the starting materials, the carboxyl group, as represented by $R_o$ in the above-given formula, is preferably a free carboxyl group. However, as previously indicated, $R_o$ may also stand for a functionally converted carboxyl group, such as, for example, carbamyl, as well as carbo-lower alkoxy, e.g., carbomethoxy, carbethoxy and the like, halogeno-carbonyl, e.g., chlorocarbonyl and the like.

The ring closure may be effected by treating the starting material with a strong Lewis acid ring closing reagent selected from the group of Friedel-Crafts reagents, such as, for example, polyphosphoric acid, stannic chloride, aluminum chloride, sulfuric acid, hydrochloric acid, boron trifluoride and the like. If necessary, the mixture of the starting material and the ring closing reagent is diluted with an appropriate inert solvent, the selection of which depends largely on the solubility capacity of the starting material and the nature of the ring closing reagent; preferred inert solvents are, for example, benzene, toluene, hexane, carbon disulfide, diethyl ether and the like. The reaction is preferably carried out at an elevated temperature, if necessary, in a closed vessel and/or in the atmosphere of an inert gas, e.g., nitrogen.

The starting materials and the salts thereof used in the above procedure are new and are intended to be included within the scope of this invention. Especially useful as starting materials are the compounds of the formula:

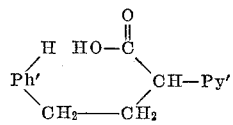

in which Ph' and Py' have the previously given meaning, or acid addition salts thereof.

The starting materials may be prepared, for example, by reacting the salt of a functional derivative of a pyridyl-acetic acid, particularly an alkali metal salt of a compound of the formula:

in which Py and R have the previously given meaning, and $R_o'$ represents a functionally converted carboxyl group, with a reactive ester of a phenyl-lower alkanol, particularly with a compound of the formula:

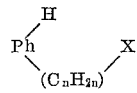

in which Ph, $n$ and the group of the formula —$(C_nH_{2n})$— have the previously given meaning, and X represents a reactively esterified hydroxyl group, particularly a halogeno atom, and, if necessary, converting in a resulting compound a functionally converted carboxyl group into the free carboxyl group or into another functionally converted carboxyl group, and/or, if desired, converting a resulting salt into the free compound or into another salt, and/or, if desired, replacing in a resulting compound having a hydrogen attached to the carbon atom carrying the pyridyl group, such hydrogen by lower alkyl, and/or, if desired, introducing into the carbocyclic aryl, e.g., 1,2-phenylene, portion of a resulting compound a substituent, and/or, if desired, converting in a resulting compound a substituent attached to the carbocyclic aryl, e.g., 1,2-phenylene, portion into another substituent, and/or, if desired, converting a resulting compound into a salt, an N-oxide or a salt of an N-oxide thereof.

A salt of a functional derivative of a pyridyl-acetic acid is primarily an alkali metal salt, e.g., lithium, sodium, potassium and the like, salt; the latter may be prepared according to known methods, for example, by treatment with an alkali metal, e.g., sodium and the like, an alkali metal hydroxide, e.g., lithium hydroxide, sodium hydroxide, potassium hydroxide and the like, an alkali metal hydride, e.g., sodium hydride and the like, an alkali metal amide, e.g., sodium amide, potassium amide and the like, an alkali metal lower alkanolate, e.g., sodium or potassium methanolate, ethanolate, n-butanolate, tertiary butanolate and the like, or any other suitable reagent, using appropriate inert solvents as diluents. A functionally converted carboxyl group as represented by $R_o'$ is primarily a cyano group; the starting material is, therefore, primarily a salt, particularly an alkali metal salt of a pyridyl-acetonitrile having the formula:

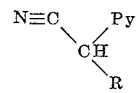

in which Py and R have the previously given meaning.

The reactively esterified hydroxyl group of the second reagent, as represented by X in the above formula, is primarily a hydroxyl group esterified with a strong inorganic acid, particularly mineral acid, e.g., hydrochloric, hydrobromic, hydroiodic, sulfuric acid and the like, or a strong organic sulfonic acid, e.g., p-toluene sulfonic acid. Such group, is, therefore, above all a halogeno atom, e.g., chloro, bromo, iodo and the like, as well as any other analogous, reactively esterified hydroxyl group. These compounds may be prepared, for example, by treating the corresponding phenyl-lower alkanol with an appropriate reagent capable of converting a free hydroxyl group into a reactively esterified hydroxyl group, particularly a halogeno group, for example, by treatment with a thionyl halide, e.g., thionyl chloride and the like, a phosphorus halide, e.g., phosphorus tribromide and the like, or any other suitable reagent.

The reaction of the salt of a functionally converted pyridyl-acetic acid and the reactive ester of a phenyl-lower alkanol is carried out according to known methods, preferably in the presence of an inert solvent, for example, toluene, N,N-dimethylformamide and the like, and if necessary, while cooling or heating, and/or in the atmosphere of an inert gas, e.g., nitrogen.

A functionally converted carboxyl group in the resulting starting material is converted into a free carboxyl or another functionally converted carboxyl group according to known methods. For example, a cyano group may be converted into a carbamyl group or a free carboxyl group by treatment with an aqueous solution of an alkali metal hydroxide, e.g., sodium hydroxide and the like.

The compounds of the present invention may also be prepared by reacting a salt of a benz[b]cycloalkan-1-one, particularly the alkali metal salt of a compound of the formula:

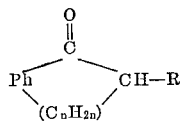

in which Ph, R, $n$ and the group of the formula

have the previously given meaning, with a halogeno-pyridine compound, particularly a compound of the formula Py-Hal, in which Py has the aforementioned meaning, and Hal stands for halogeno, and if desired, carrying out the optional steps.

The above reaction is carried out according to known methods; a halogeno-pyridine compound is particularly a 3-bromo-pyridine compound and the like, which is reacted preferably with an alkali metal, such as the sodium, salt of the benz[b]cycloalkan-1-one compound in an inert solvent. The starting materials used in the above procedure are known or may be prepared according to known methods.

In a compound resulting from one of the above procedures, which has a hydrogen attached to the carbon atom carrying the pyridyl group, such hydrogen may be replaced by lower alkyl; in other words, the group R in the above formulae, whenever representing hydrogen, may be replaced by lower alkyl. The replacement may be carried out according to any known alkylation procedure. For example, a salt, particularly an alkali metal salt, may be formed by treatment of a resulting benz[b]cycloalkan-1-one with a salt-forming, e.g., alkali metal salt-forming reagent, such as for example, an alkali metal, e.g., lithium, sodium, potassium, or an alkali metal, e.g. lithium, sodium, potassium and the like, hydride, amide, lower alkanolate, such as methanolate, ethanolate, tertiary butanolate and the like, in the presence of an appropriate inert solvent, and reacting the resulting metal, particularly alkali metal, salt with a reactive ester of a lower alkanol, particularly with a lower alkyl halide, e.g. methyl, ethyl, n-propyl, isopropyl, n-butyl, isobutyl, secondary butyl chloride, bromide or iodide and the like. The alkylation reaction may be carried out while cooling at room temperature or at an elevated temperature, and/or, if necessary, in a closed vessel and/or in the atmosphere of an inert gas, e.g. nitrogen.

A substituent may be introduced into the 1,2-phenylene portion of a resulting compound. For example, upon nitration with a suitable nitrating reagent a nitro group may be introduced into the aromatic portion.

Certain substituents attached to the 1,2-phenylene portion of the resulting compounds may be converted into other substituents. For example, a nitro group may be reduced to an amino group according to known reduction methods, for example, by controlled treatment with hydrogen in the presence of a suitable catalyst, e.g. palladium on charcoal and the like, and of an inert solvent, e.g., p-dioxane and the like. An amino group may be converted into a halogeno atom by diazotization, followed by treatment with a cuprous halide according to the Sandmeyer reaction. Or, a lower alkoxy, e.g., methoxy and the like, group may be converted into a free hydroxyl group, for example, by acidic hydrolysis with hydrobromic acid in the presence of acetic acid and the like.

Ketone derivatives of the resulting compounds are prepared according to known methods. For example, nitrogenous ketone derivatives, particularly the oximes, as well as the hydrazones, semicarbazones, thiosemicarbazones and the like, may be prepared by treating the resulting ketone compound with the reagent or a salt thereof, especially with hydroxylamine or a salt, such as the hydrochloride, sulfate and the like, thereof, as well as with a hydrazine, a semicarbazide, a thiosemicarbazide and the like, or a salt thereof The reaction is preferably carried out while heating in the presence of an inert solvent and, if necessary, of an acid neutralizing reagent, e.g., sodium carbonate and the like, particularly whenever an acid addition salt of a reagent is used, and/or a buffer, e.g. sodium acetate and the like, and/or in the atmosphere of an inert gas, e.g. nitrogen. Other ketone derivatives, such as the ketals, are prepared by reacting the resulting ketone compound with the reagent, such as a lower alkane diol, e.g. ethylene glycol and the like, in the presence of a catalytic amount of a suitable acid, e.g. toluene sulfonic acid and the like.

A resulting salt may be converted into the free base, for example, by treatment with a base, such as, for example, an alkali metal hydroxide, e.g. lithium hydroxide, sodium hydroxide, potassium hydroxide and the like, an alkali metal carbonate, e.g. lithium, sodium or potassium carbonate or hydrogen carbonate and the like, ammonia or any other suitable base, or with an anion exchange resin and the like.

A resulting salt may be converted into another salt according to known methods, for example, by treatment with an appropriate salt, e.g., sodium, potassium, silver and the like, salt of an acid, such as of one of the above described acids, preferably in the presence of a suitable inert solvent.

A resulting free base may be converted into its acid addition salts by reacting the former with an acid, such as one of those mentioned hereinbefore, for example, by treating a solution of the base in a suitable inert solvent or solvent mixture with the acid or a solution thereof and isolating the desired salt. Salts may also be obtained in the form of hydrates, e.g. hemihydrates, monohydrates, sesquihydrates or polyhydrates, or may contain solvent of crystallization depending on the conditions used in the formation of the salts.

An N-oxide of a resulting compound may be prepared according to known methods, for example, by treatment with a peracid, particularly an organic carboxylic peracid, e.g., peracetic, perbenzoic, perphthalic acid and the like, or any other suitable peracid, as well as with other N-oxidation reagents, e.g., hydrogen peroxide and the like, perferably in an inert solvent.

The compounds of this invention may be converted into their quaternary ammonium derivatives, for example, by reacting them with a reactive ester formed by a hydroxylated compound and a strong acid. Such reactive esters are, for example, those previously mentioned yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g., nitrogen. A resulting quaternary ammonium compound may be converted into the corresponding quaternary ammonium hyroxide, for example, by reacting a quaternary ammonium halide with silver oxide, or a quaternary ammonium sulfate with barium hydroxide, or by treating a quaternary ammonium salt with an anion exchanger, or by electrodialysis. From a resulting quaternary ammonium base there may be prepared other quaternary ammonium salts with acids, for example, with those outlined hereinbefore for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be obtained as hydrates.

The new compounds of this invention may be obtained in the form of mixtures of racemates, which mixtures may be separated into the individual racemates on the basis of physico-chemical differences, such as solubility and the like, for example, by fractional crystallization, fractional distillation and the like.

Racemates of the compounds of this invention may be resolved into the optically active d- and l-forms according to known procedures used for the resolution of racemic compounds. For example, the free base of a racemic d,l-compound, dissolved in an appropriate solvent, such as a lower alkanol, e.g., methanol, ethanol and the like, a halogenated aliphatic hydrocarbon, e.g. methylene chloride, chloroform and the like, or any other suitable diluent, may be treated with one of the optically active forms of an acid containing an asymmetric carbon atom or a solution thereof, for example, in one of the previously-mentioned diluents. Especially useful as optical active forms of salt forming acids having an asymmetric carbon atom are D-tartaric (also l-tartaric) and L-tartaric (also d-tartaric) acid, as well as the optically active forms of malic, mandelic, camphor-10-sulfonic, quinic, di-o-toluyl-tartaric acid and the like. A salt may then be isolated, which is formed by the optically active acid with the optically active form of the base. From a resulting salt, the free and optically active base may be obtained according to known methods, such as outlined hereinbefore, and an optically active base may be converted into a therapeutically useful acid addition salt with an acid such as one of those mentioned hereinbefore. The optically active forms may also be isolated by biochemical methods.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

11 g. of 4-phenyl-2-(3-pyridyl)-butyric acid is stirred into 55 g. of polyphosphoric acid, preheated to 90°. The temperature is elevated to 105–110° and maintained at that level for 25 minutes. The resulting clear solution is stirred into ice-water, the mixture is neutralized with 50 percent aqueous sodium hydroxide while keeping the temperature below 40°. The pH is adjusted to 8 by adding sodium carbonate, and the resulting crystalline precipitate is filtered off and taken up in diethyl ether. The organic solution is washed with water and saturated aqueous sodium chloride solution, dried over sodium sulfate, filtered and evaporated to dryness to yield 9.3 g. of the colorless crystalline 2-(3-pyridyl)-1,2,3,4-tetrahydro-naphthalen-1-one of the formula:

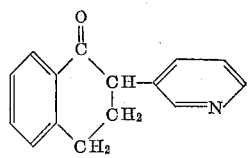

The compound is purified by recrystallization from a mixture of ethanol and water, M.P. 79–80°; the infrared absorption spectrum shows the characteristic conjugated carbonyl band at 1688 $cm^{-1}$.

The starting material used in the above procedure may be prepared as follows: To an ice-bath cooled solution of 25.7 g. (0.218 mol) of 3-pyridyl-acetonitrile in 150 ml. of N,N-dimethylformamide is added in small portions 10.49 g. of a 53 percent suspension of sodium hydride in mineral oil (0.218 mol) while stirring. The mixture is agitated at room temperature until hydrogen evolution ceases and is then again cooled in an ice-bath. A solution of 40.2 g. (0.218 mol) of 2-bromoethyl-benzene in 150 ml. of toluene is added in a slow stream; the resulting mixture is stirred for three hours at room temperature and then allowed to stand overnight at room temperature. The inorganic material (sodium bromide) is filtered off, the filtrate is evaporated to a total volume of 100 ml., and diluted with water. The organic material is extracted with three portions of diethyl ether, the organic solutions are washed with a saturated aqueous sodium chloride solution, dried over sodium sulfate, filtered and evaporated to dryness. The residue is distilled to yield 30.8 g. of a yellow oil representing 4-phenyl-2-(3-pyridyl)-butyronitrile, B.P. 143–150°/0.01 mm.

To a solution of 15.0 g. of 4-phenyl-2-(3-pyridyl)-butyronitrile in 60 ml. of ethanol (95 percent strength) is added a solution of 30 g. of sodium hydroxide in 30 ml. of water, and the mixture is refluxed for 64 hours. The organic solvent is evaporated under reduced pressure, more water is added and the pH is adjusted to 5 with 2 N aqueous hydrochloric acid and aqueous acetic acid. The mixture is extracted three times with diethyl ether; the organic extracts are washed with a saturated aqueous sodium chloride solution, dried over sodium sulfate and evaporated to dryness. The acetic acid remaining in the residue is driven off by blowing air over the surface of the oily product. 14.0 g. of 4-phenyl-2-(3-pyridyl)-butyric acid of the formula:

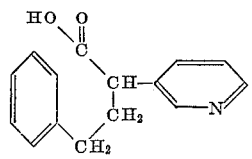

is recovered; the product melts at 106–108° and is recrystallized from a mixture of ethanol and water, M.P. 110–112.5°.

The hydrolysis of the 4-phenyl-2-(3-pyridyl)-butyronitrile to the corresponding acid may also be carried out in stages: to a solution of 2.0 g. of 4-phenyl-2-(3-pyridyl)-butyronitrile in 15 ml. of ethanol (95 percent) are added first a solution of 4 ml. of hydrogen peroxide (30 percent) in 10 ml. of ethanol (95 percent) and then dropwise 0.4 ml. of a 6 N aqueous solution of sodium hydroxide. The mixture is heated to 56° and maintained at that temperature for three hours. It is then diluted with water, whereupon 1.1 g. of a white crystalline precipitate is formed. The latter is recrystallized from a mixture of ethanol and water to yield the desired 4-phenyl-2-(3-pyridyl)-butyric acid amide, M.P. 145–146°. This amide can be hydrolized further by treatment with an aqueous sodium hydroxide solution to form the desired free acid which is used as the starting material in the above reaction, or it may be used directly in the cyclization to the 2-(3-pyridyl)-1,2,3,4-tetrahydro-naphthalen-1-one.

*Example 2*

A solution of 3.0 g. of 2-(3-pyridyl)-1,2,3,4-tetrahydro-naphthalen-1-one in 25 ml. of ethanol (of 95 percent strength) and a mixture of 3.0 g. of hydroxylamine hydrochloride, 3.0 g. of sodium carbonate monohydrate and 3.0 g. of sodium acetate in 25 ml. of water are combined; the reaction mixture is refluxed for 24 hours and is then allowed to cool to room temperature. A colorless crystalline precipitate (prisms) is formed, which is filtered off, washed with water and recrystallized from a mixture of ethanol and water to yield 2.2 g. of 1-oximino-2-(3-pyridyl)-1,2,3,4-tetrahydro-naphthalene of the formula:

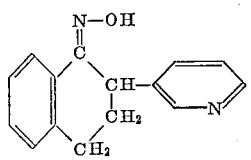

which melts at 180–181°.

Example 3

To 5.0 g. of polyphosphoric acid, pre-heated to 95°, is added 1.0 g. of 5-phenyl-2-(3-pyridyl)-valeric acid. The temperature is then raised to and maintained at 105–110° for thirty minutes with occasional stirring. The hot, sirupy reaction product is stirred into a mixture of ice and water, the aqueous mixture is made alkaline with 50 percent aqueous sodium hydroxide and 2 N aqueous sodium carbonate. The organic material is extracted three times with diethyl ether, the organic layers are washed with a saturated aqueous solution of sodium chloride, dried over sodium sulfate, filtered and evaporated. The residue is distilled to yield 0.5 g. of 2-(3-pyridyl)-benzosuberan-1-one of the formula:

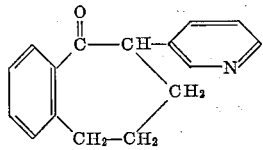

which boils at 140°/0.04 mm. The infrared absorption spectrum shows the characteristic conjugated carboxyl band at 1680 cm$^{-1}$.

The starting material used in the above procedure may be prepared as follows: To a stirred solution of 11.8 g. of 3-pyridyl-acetonitrile (0.1 mol) in 70 ml. of N,N-dimethylformamide, which is cooled in an ice-bath, is added in small portions 4.8 g. of a 50 percent mineral oil suspension of sodium hydride (0.1 mol). The ice-bath is removed and the mixture is stirred until hydrogen evolution ceases, whereupon cooling with the ice-bath is continued. A solution of 15.5 g. of 3-chloropropyl-benzene (0.1 mol) in 70 ml. of toluene is added in a slow stream; the ice-bath is again removed and the reaction mixture is stirred at room temperature for three hours and then allowed to stand overnight. The inorganic precipitate is filtered off and the solid material is washed with diethyl ether. The filtrate and the washings are combined and evaporated to dryness under reduced pressure, the residue is taken up in water, and the organic material is extracted with chloroform. The organic solution is washed twice with a 1:1-mixture of concentrated hydrochloric acid and water, the acidic aqueous washings are neutralized with aqueous sodium hydroxide, and the organic material is removed by extraction of the aqueous solution with chloroform. The organic solution is separated, washed twice with a saturated aqueous sodium chloride solution, dried over sodium sulfate and evaporated to dryness. The desired 5-phenyl-2-(3-pyridyl)-valeronitrile is purified by distillation; the tan oil boils at 145–153°/0.04 mm.; yield: 11.1 g.

To a solution of 11.1 g. of 5-phenyl-2-(3-pyridyl)-valeronitrile in 44 ml. of ethanol (95 percent) is added a solution of 22 g. of sodium hydroxide in 22 ml. of water, and the mixture is refluxed for 64 hours. The organic solvent is evaporated under reduced pressure, the residue is diluted with water, and the clear solution is adjusted to pH 5 by adding a 1:1 mixture of concentrated hydrochloric acid and water, and acetic acid. The organic material is extracted twice with diethyl ether and once with chloroform; the combined organic extracts are swirled with solid sodium chloride, decanted and dried over sodium sulfate. The solvents are removed, the remaining viscous oil crystallizes from water and a small amount of ethanol to yield 5.1 g. of 5-phenyl-2-(3-pyridyl)-valeric acid of the formula:

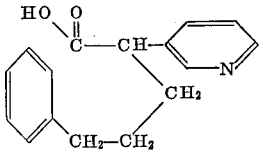

which melts at 114–116° after recrystallization from ethanol; yield of the pure product: 4.2 g.

Example 4

To a solution of 0.6 g. of 2-(3-pyridyl)-benzosuberan-1-one in 40 ml. of a 1:1-mixture of ethanol and water are added 1.0 g. of hydroxylamine hydrochloride, 1.0 g. of sodium carbonate monohydrate and 1.0 g. of sodium acetate, and the mixture is refluxed for 24 hours. The ethanol is then removed under reduced pressure, the organic material is extracted twice with diethyl ether, and the organic solutions are washed, dried and evaporated. 0.5 g. of a crystalline solid residue is recovered and is recrystallized from ethanol and water to yield the 1-oximino-2-(3-pyridyl)-benzosuberane of the formula:

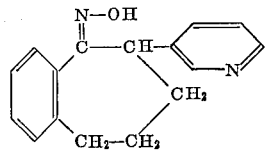

which melts at 172–174°.

Example 5

1.0 g. of 3-phenyl-2-(3-pyridyl)-isocaproic acid is added while stirring to 5.0 g. of polyphosphoric acid kept at 100°; the temperature is raised to 101–110° and maintained at the level for thirty minutes. The reaction mixture is then poured into ice-water and the pH of the aqueous mixture is adjusted to about 8 by adding an aqueous solution of sodium hydroxide and solid sodium carbonate. The organic material is extracted with ethyl acetate and diethyl ether; the resulting extracts are combined, washed with a saturated aqueous sodium chloride solution, dried over sodium sulfate, filtered and evaporated to dryness. The desired 3-isopropyl-2-(3-pyridyl)-indan-1-one of the formula:

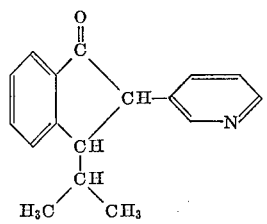

is obtained as a viscous, yellow oil, which is purified by distillation, B.P. 130°/0.1 mm.; yield: 0.68 g.

The starting material is prepared as follows: 44.4 g. of 1-phenyl-isobutanol (prepared by reduction of isobutyrophenone with lithium aluminum hydride) is added to 36 ml. of thionyl chloride while keeping the temperature at about 0°. After the addition is completed, the temperature is allowed to rise, the excess thionyl chloride is removed under reduced pressure, and the remaining oil is distilled to yield 45.5 g. of 1-phenyl-isobutyl chloride, B.P. 96°/18 mm.

A solution of 11.8 g. of 3-pyridyl-acetonitrile in 165 ml. of N,N-dimethylformamide is cooled in a bath of a temperature between —15° and —5°; 4.8 g. of a 52 percent mineral oil suspension of sodium amide is added in small portions while stirring and cooling. The reaction mixture is then allowed to warm up to room temperature until the hydrogen evolution ceases and is again cooled to −10°. A solution of 16.8 g. of 1-phenyl-isobutyl chloride in 50 ml. of N,N-dimethylformamide is added dropwise. The mixture is then brought to room temperature, stirred for three hours and allowed to stand overnight. The inorganic material is filtered off, a five-fold volume of water is added and the pH is adjusted to 7. The organic material is extracted three times with diethyl ether; the combined organic extracts are washed three times with a 1:1-mixture of concentrated hydrochloric acid and water, and the acidic washings are neutralized with aqueous sodium hydroxide and sodium carbonate. The resulting oily layer, which crystallizes partly, is taken up in diethyl ether, the organic solution is washed with a saturated sodium chloride solution, dried over sodium sulfate, filtered and evaporated. The residue is crystallized from a mixture of diethyl ether and hexane to yield 0.9 g. of 3-phenyl-2-(3-pyridyl)-isocapronitrile, which is recrystallized from a mixture of ethanol and water, M.P. 96–97°.

A solution of 6.0 g. of 3-phenyl-2-(3-pyridyl)-isocapronitrile in 30 ml. of ethanol (95 percent) and 15 g. of sodium hydroxide in 15 ml. of water is refluxed for thirty hours. The reaction mixture is diluted with water, the solid material, representing the 3-phenyl-2-(3-pyridyl)-isocaproic acid amide (M.P. 222–224° after recrystallization from a mixture of ethanol and water) is filtered off, and the filtrate is acidified to pH 4 to 5 by adding acetic acid. The resulting suspension is extracted three times with chloroform, the organic extracts are washed with a saturated aqueous sodium chloride solution, dried over sodium sulfate, filtered and evaporated to leave a gummy residue. The latter is crystallized from a mixture of chloroform, benzene and hexane to yield the colorless crystalline 3-phenyl-2-(3-pyridyl)-isocaproic acid of the formula:

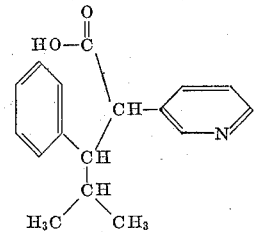

which is purified by recrystallization from a 10:10:1-mixture of benzene, hexane and ethanol, M.P. 197–198° (first crop); yield: 3.62 g.

Example 6

To a solution of 2.0 g. of 2-(3-pyridyl)-1,2,3,4-tetrahydro-naphthalen-1-one in 25 ml. of N,N-dimethylformamide is added in small portions 0.43 g. of a 53 percent mineral oil suspension of sodium hydride while cooling in an ice-bath. The temperature is allowed to rise until the hydrogen evolution ceases, cooling is then continued and a solution of 1.28 g. of methyl iodide in 15 ml. of N,N-dimethylformamide is added. Cooling is discontinued and the reaction mixture is stirred for three hours at room temperature and then allowed to stand overnight. Benzene is added, the solid material is filtered off, the filtrate is evaporated to dryness and the residue is taken up in water. The organic material is extracted with diethyl ether, the organic solution is washed with a saturated aqueous solution of sodium chloride and dried over sodium sulfate, filtered and evaporated. The 2-methyl-2-(3-pyridyl)-1,2,3,4-tetrahydro-naphthalen - 1 - one of the formula:

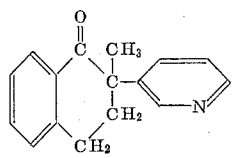

is purified by distillation, B.P. 129–131°/0.03 mm.; yield: 1.3 g.

Other benz[b]cycloalkan-1-ones, which contain both a pyridyl and a lower alkyl group attached to the carbon atom adjacent to the carbonyl group are, for example, 6-chloro-2-methyl-2-(3-pyridyl) - 1,2,3,4 - tetrahydro-naphthalen-1-one as a yellow oil, B.P. 155°/0.06 mm., as well as 2-ethyl-2-(3-pyridyl)-1,2,3,4-tetrahydro-naphthalen-1-one, 2-isopropyl-2-(3-pyridyl) - 1,2,3,4 - tetrahydro-naphthalen-1-one, 2-methyl-2-(4-pyridyl) - 1,2,3,4 - tetrahydro-naphthalen-1-one, 7-chloro-2-methyl-2-(3-pyridyl)-1,2,3,4-tetrahydro-naphthalen-1-one, 8-chloro-2-ethyl-2-(3-pyridyl)-1,2,3,4-tetrahydro-naphthalen-1-one, 2-methyl-2-(3-pyridyl)-benzo-suberan-1-one and the like, may be prepared according to the above outlined procedure.

Example 7

A mixture of 43.5 g. of polyphosphoric acid (preheated to 105°) and 8.7 g. of 4-(3-chloro-phenyl)-2-(3-pyridyl)-butyric acid is maintained at a temperature of 110–112° and occasionally stirred and then poured onto ice. The pH is adjusted to 8 with a 50 percent aqueous solution of sodium hydroxide and solid sodium carbonate. The organic material is extracted three times with ethyl acetate, the extracts are washed with a saturated aqueous solution of sodium chloride and dried over sodium sulfate. The solvent is evaporated to dryness, the residue is recrystallized several times from a mixture of ethanol and water and from a mixture of benzene and pentane and then chromatographed on aluminum oxide. A crop of crystalline material, melting at 102–104°, is isolated from the first benzene eluates, and a second crop of 3.5 g. of crystalline material, melting at 110–133° (yield of the latter: 3.5 g.) is eluated with the second benzene washings and with a 4:1-mixture of benzene and diethyl ether. The second crop is rechromatographed on aluminum oxide and the 8-chloro-2-(3-pyridyl) - 1,2,3,4 - tetrahydro-naphthalen-1-one of the formula:

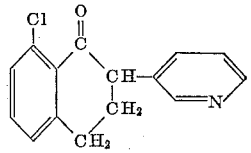

is isolated from the 7:3-mixture, 4:1-mixture and 9:1-mixture of benzene and hexane, and benzene. After distillation, the product is obtained as colorless crystals, melting at 142–144° after recrystallization from a mixture of benzene and pentane.

The starting material is prepared according to the method described in Example 1; m-chloro-bromobenzene is converted into the m-chloro-benzene magnesium bromide, the Grignard reagent is treated with ethylenoxide to yield the 2-(3-chloro-phenyl)-ethanol (B.P. 96–115°/3 mm.), which is treated with phosphorus tribromide. The sodium salt of 3-pyridyl-acetonitrile, prepared by treating the latter with sodium hydride, is reacted with the 2-(3-chloro-phenyl)-ethyl bromide (B.P. 77–97°/3 mm.), and the resulting 4-(3-chloro-phenyl)-2-(3 - pyridyl)-butyronitrile (B.P. 162°/0.05 mm.) is hydrolized by treatment with a mixture of sodium hydroxide, ethanol and water to the desired 4-(3-chloro-phenyl)-2-(3-pyridyl)-butyric acid of the formula

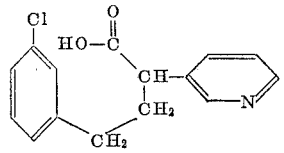

which melts at 147°.

Example 8

A mixture of 25.0 g. of polyphosphoric acid and 5.0 g. of 4-(3 - chloro-phenyl) - 2 - (3 - pyridyl)-butyric acid is reacted and worked up as shown in Example 7. 4.5 g. of crystalline material can be recovered from the oily product of the ethyl acetate extraction which is recrystallized from a mixture of benzene and pentane and then from a mixture of ethanol and water to yield a first crop of 1.9 g. of the 6-chloro-2-(3-pyridyl)-1,2,3,4-tetrahydro-naphthalen-1-one of the formula

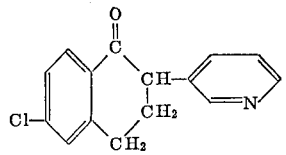

melting at 100–102°; a second crop of 1.75 g. is isolated.

Other compounds, which may be prepared according to the previously described method by selecting the appropriate starting materials are, for example, 7-chloro-2-(3-pyridyl)-1,2,3,4-tetrahydro-naphthalen-1-one, M.P. 88–89° (after recrystallization from a mixture of ethanol and water), prepared by hydrolysis of 4-(4-chloro-phenyl)-2-(3-pyridyl)-butyronitrile (B.P. 168–190°/0.05 mm.) and ring closure of the resulting 4-(4-chlorophenyl)-2-(3-pyridyl)-butyric acid (M.P. 133–135°) with polyphosphoric acid; 6-methoxy-2-(3-pyridyl)-1,2,3,4-tetrahydro-naphthalen-1-one, M.P. 117–118° (after recrystallization from a mixture of benzene and pentane), prepared by hydrolysis of 4-(3-methoxy-phenyl)-2-(3-pyridyl)-butyronitrile, B.P. 148–163°/0.04 mm.) and ring closure of the resulting 4-(3-methoxy-phenyl)-2-(3-pyridyl)-butyric acid (M.P. 92°) with polyphosphoric acid, as well as 6-fluoro-2-(3-pyridyl)-1,2,3,4-tetrahydro-naphthalen-1-one,
6-methyl-2-(3-pyridyl)-1,2,3,4-tetrahydro-naphthalen-1-one,
2-(4-pyridyl)-1,2,3,4-tetrahydro-naphthalen-1-one,
6-chloro-2-(4-pyridyl)-1,2,3,4-tetrahydro-naphthalen-1-one,
6-amino-2-(4-pyridyl)-1,2,3,4-tetrahydro-naphthalen-1-one,
6-methoxy-2-(4-pyridyl)-1,2,3,4-tetrahydro-naphthalen-1-one,
7-chloro-(2-pyridyl)-1,2,3,4-tetrahydro-naphthalen-1-one,
7-acetyl amino-2-(3-pyridyl)-1,2,3,4-tetrahydro-naphthalen-1-one,
7-bromo-2-(3-pyridyl)-1,2,3,4-tetrahydro-naphthalen-1-one,
7-chloro-2-(3-pyridyl)-benzosuberan-1-one,
4-methyl-2-(3-pyridyl)-1,2,3,4-tetrahydro-naphthalen-1-one and the like.

*Example 9*

A mixture of 2.46 g. of 6-methoxy-2-(3-pyridyl)-1,2,3,4-tetrahydro-naphthalen-1-one, 30 ml. of glacial acetic acid and 30 ml. of 48 percent hydrobromic acid is refluxed for six hours. A great portion of the solvent mixture is removed under reduced pressure, the residual solution is diluted with water and the aqueous solution is made basic with an aqueous solution of sodium hydroxide. The basic solution is washed with ethyl acetate, the aqueous phase is adjusted to pH 5 with acetic acid, the solid material is filtered off and the filtrate is extracted with ethyl acetate. The crystalline material removed by filtration is combined with the solid residue from the ethyl acetate extract and recrystallized from ethanol to yield the 6-hydroxy-2-(3-pyridyl)-1,2,3,4-tetrahydro-naphthalen-1-one of the formula

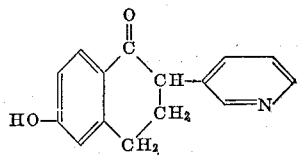

which melts at 215–221°.

*Example 10*

To 2.0 g. of 2-(3-pyridyl)-1,2,3,4-tetrahydro-naphthalen-1-one is added 20 ml. of fuming nitric acid while cooling in an ice bath and stirring with a magnetic stirrer; during the addition of the acid, the temperature is about 14°. The resulting solution is stirred for an additional two hours at room temperature and is then poured onto ice. The aqueous mixture is adjusted to pH 8 with a 50 percent aqueous solution of sodium hydroxide and solid sodium carbonate. An orange crystalline material precipitates, which is recrystallized from ethanol and then from methanol to yield the 7-nitro-2-(3-pyridyl)-1,2,3,4-tetrahydro-naphthalen-1-one nitrate of the formula

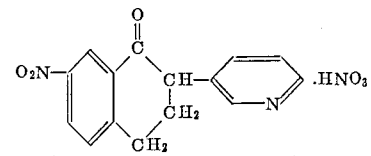

which melts at 147–150°, and shows infrared absorption bands at 1523 cm.$^{-1}$ and 1465 cm.$^{-1}$, indicating the presence of nitro.

A solution of the above nitro compound in p-dioxane, when treated with about six mols of hydrogen in the presence of a palladium catalyst (10 percent palladium on charcoal), yields the desired 7-amino-2-(3-pyridyl)-1,2,3,4-tetrahydro-naphthalen-1-one.

*Example 11*

To a solution of 8.92 g. of 2-(3-pyridyl)-1,2,3,4-tetrahydro-naphthalen-1-one in 25 ml. of acetone is added 6.25 g. of methyl iodide in 10 ml. of acetone. The reaction mixture is allowed to stand for five hours, a yellow oil separates and crystallizes on scratching. The crude 2-(3-pyridyl)-1,2,3,4-tetrahydro-naphthalen-1-one methiodide is collected, washed twice with acetone and once with diethyl ether and recrystallized from ethanol, M.P. 196–198°.

What is claimed is:

1. A compound of the formula:

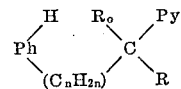

in which Ph stands for a member selected from the group consisting of 1,2-phenylene, lower alkyl-1,2-phenylene, hydroxy-1,2-phenylene, lower alkoxy-1,2-phenylene, halogeno-1,2-phenylene, nitro-1,2-phenylene and amino-1,2-phenylene, Py stands for pyridyl, R stands for a member selected from the group consisting of hydrogen and lower alkyl, the group of the formula —$(C_nH_{2n})$— is lower alkylene separating the group Ph from the carbon atom carrying the group Py by one to three carbons atoms, and $R_0$ is carboxyl.

2. A compound of the formula:

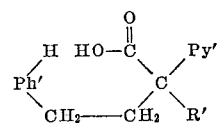

in which Py' represents pyridyl, Ph' stands for halogeno-1,2-phenylene, and R' represents hydrogen.

3. 4-phenyl-2-(3-pyridyl)-butyric acid.
4. 4-(3-chloro-phenyl)-2-(3-pyridyl)-butyric acid.

5. 4-(4-chloro-phenyl)-2-(3-pyridyl)-butyric acid.
6. 4-(4-methoxy-phenyl)-2-(3-pyridyl)-butyric acid.

References Cited by the Examiner

UNITED STATES PATENTS

| | | | |
|---|---|---|---|
| 2,511,319 | 6/1950 | Beiler et al. | 260—297 |
| 2,713,051 | 7/1955 | Walter et al. | 260—295 |
| 2,727,895 | 12/1955 | Sperber et al. | 260—294.9 |
| 2,742,480 | 4/1956 | Barley et al. | 260—295 |
| 2,781,348 | 2/1957 | Schlittler et al. | 260—296 |

FOREIGN PATENTS 1,073,497  1/1960  Germany.

WALTER A. MODANCE, *Primary Examiner.*

IRVING MARCUS, NICHOLAS S. RIZZO, *Examiners.*